Aug. 10, 1965   L. J. KORSON   3,199,379

METHOD OF MANUFACTURING TREPANNING HEAD

Filed Feb. 15, 1963

INVENTOR.
LEONARD J. KORSON
BY
Barlow & Barlow
ATTORNEYS

United States Patent Office 3,199,379
Patented Aug. 10, 1965

3,199,379
METHOD OF MANUFACTURING
TREPANNING HEAD
Leonard J. Korson, Manville, R.I., assignor, by mesne assignments, to Madison Industries Inc., Pawtucket, R.I., a corporation of Rhode Island
Filed Feb. 15, 1963, Ser. No. 258,685
3 Claims. (Cl. 76—101)

This invention pertains to a method of manufacturing a trepanning head or more generically a boring tool.

In a trepanning head there are two parts thereof which require frequent replacement, namely, the cutting bit and the wear pads. In the past it has been quite common to utilize a cutting bit with a simple securing means such as clamp screws and the like to facilitate replacement, but the wear pads have presented another problem. Prior constructions have utilized a dovetailed cross sectional recess into which wear pads were driven. When replacement of the pad occurs, it has been necessary to remove the tool from the machine in order to accomplish the wear pad change, and further it has been necessary to set up the tool in a grinding machine to grind the external surface of the wear pads to the proper radius. This involves a long down time for the tool, and it is of course desirous in these days of high production costs to limit the down time of a machine to the minimum.

It is accordingly a principal object of this invention to provide a method for manufacturing a trepanning head in which the resultant head would be manufactured with an easily replaceable wear pad.

A more specific object of the invention is to manufacture a trepanning head in a fashion whereby the wear pad therefor will be retained in place by a simple retaining screw arrangement.

A further object of the invention is to provide a method of manufacturing a trepanning head in which the wear pad is pre-ground on at least the two opposite surfaces thereof, namely, the hardened wear pad surface and its opposite surface, and to pre-grind to control dimension the floor of the recess into which the wear pad is received, thus eliminating any need for grinding the wear pad when it is changed.

With these and other objects in view, the invention consists of certain novel features which will appear from the following description of a preferred embodiment thereof wherein.

Figure 1:
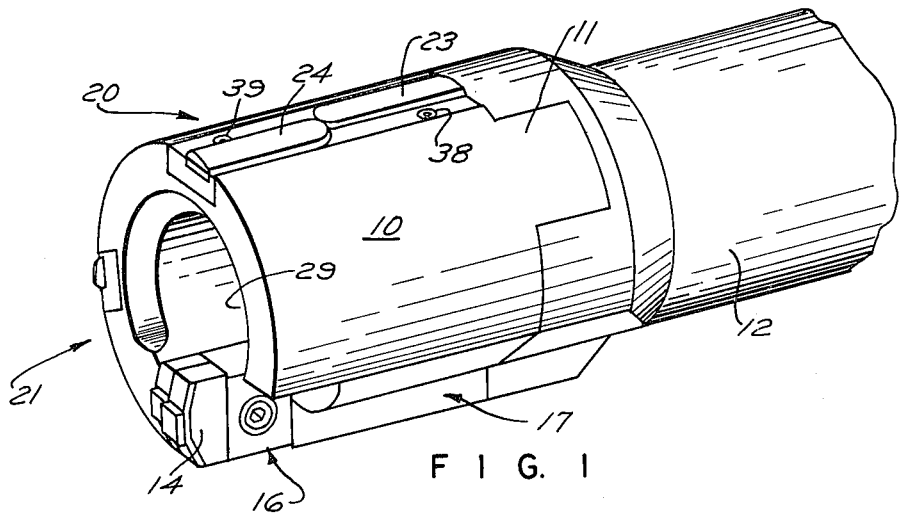
FIG. 1 is a perspective view looking at the bit end of an assembled trepanning head embodying the invention.
Figure 2:
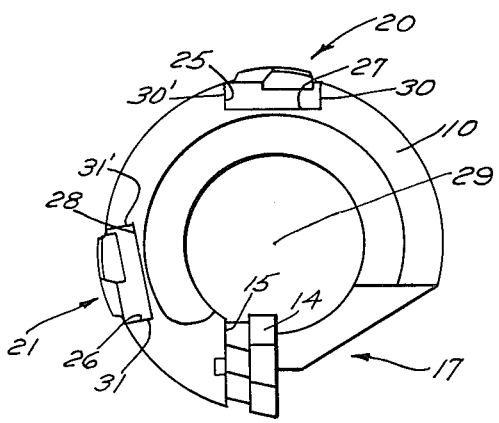
FIG. 2 is an end view thereof looking at the bit end of the head.
Figure 3:
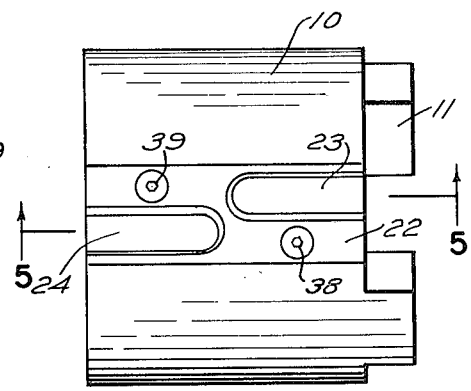
FIG. 3 is an elevational view of the head shown in FIGS. 1 and 2.

Referring now to FIG. 1, the trepanning head therein shown comprises an annular body 10 provided with dog means 11, for example, for connecting it to a boring bar 12. Physical connection is retained by axial screw means not shown or through other connection means that may be substituted and which form no real part of this invention. At the other end of the annular body there is mounted a bit 14 made of tungsten carbide or a similar hard material. This bit is mounted in a fashion on the end of the trepanning head so that the cutting edge portion thereof is radially of the head, and to this end is mounted on a seat 15 being clamped therein by suitable means such as a screw generally shown at 16. The illustrated form of the head is what is known in the trade as an O.D. exhaust tool head, and to this end generally in line with the cutting bit 14 there is provided an external channel as generally indicated at 17 running axially of the annular body, which channel provides a path for chip removal, coolant being sent through the bore of the trepanning head and exhausted through this exhaust duct 17 to the outside of the hole. Of course, as well understood to those skilled in the art, a different type of trepanning head may be used, such as the I.D. exhaust type in which a reverse flushing occurs; that is, the coolant is supplied exterior of the head and the chips are flowed out of the bottom of the hole through the bore thereof.

Figure 4:
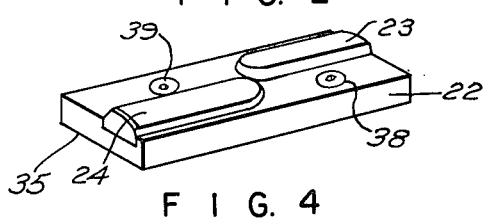
FIG. 4 is a perspective view of a wear pad made in accordance with the invention.

The trepanning head shown herein is adapted to cut against a body in a clockwise direction; that is, the bit is adapted to rotate relatively clockwise against the work, it being understood that either the work or the head may rotate, and in order to maintain the head in alignment in the hole being cut, there is provided at spaced locations on the exterior wall of the annular body wear pads generally indicated at 20 and 21. These wear pads which are shown in perspective in FIG. 4 are composed of a mounting base portion 22 and contact portions 23, 24. These contact portions 23, 24 are preferably made from a hard material such as tungsten carbide and are mounted as by welding to the base plate 22. The tungsten carbide is staggered and spaced to allow chips to pass through and prevent breaking of the wear pad. The wear pads are intended to maintain the head in alignment in the bore and they take the wear of bearing against the internal diameter of the hole being cut. These wear pads are received in a recess such as the recesses 25 and 26.

The recesses 25 and 26 extend substantially the length of the trepanning head and are provided with floors 27, 28 which are ground so as to be accurate tangents of a common circle. Additionally, the distance from each of the floors 27 and 28 to the geometric center of the trepanning head as at 29 is accurate to within .001 inch or better. This is accomplished by setting up the head in an indexing tool on a grinding machine and grinding the surface of this floor. Further while the trepanning head is in the indexing head of the grinding machine, the side walls of each of the recesses as at 30, 30' and 31, 31' of the recesses 25 and 26, respectively, are also ground so that they extend vertically from the floor to a great accuracy.

Figure 5:
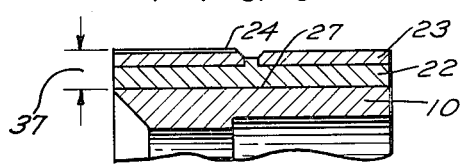
FIG. 5 is a partial cross sectional view taken on lines 5—5 of FIG. 3.
Figure 7:
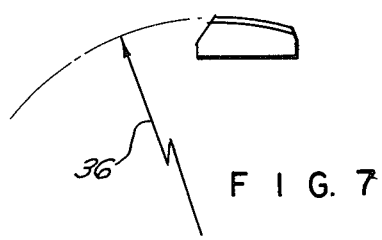
FIG. 7 is an end view of the hardened portion of the wear pad.

Similarly, the base plate 22 for the wear pads is manufactured of an accurate dimension with the base 35 thereof ground flat, and then the pad is placed in a grinding machine to produce a radius of the tungsten carbide portions 23 and 24, such as is illustrated in FIG. 7, which radius is preferably less than the radius of the hole to be bored by the head. However, during the grinding operation the thickness dimension 37 such as is illustrated in FIG. 5 is accurately controlled so that each pad is ground in an identical fashion. The wear pads are, of course, retained in position by providing screw retainers such as at 38 and 39, and it will become readily apparent that by controlling these dimensions as during the manufacturing operations outlined above, that each wear pad produced will be interchangeable with another wear pad in any head. Furthermore, by grinding the wear pads in a fashion in which the radius of the contacting portion or wear portion is made of a diameter smaller than the diameter of the hole being cut, there will be line contact afforded by the wear pad itself, thus achieving minimum friction of the parts during the cutting operation and minimizing galling or other undesirable results that can conceivably occur.

It is quite often found that in using the trepanning head of this described nature that the actual wear on the pad is achieved on the forward portion, that is, the portion which is adjacent to the cutting bit end. One of the reasons for the wear occurring at this point is the fact that as the chips are formed during the cutting operation, they sometimes lodge themselves between the inner diameter of the hole being cut and the wear pad itself, and this increases the wear because of the additional pressure afforded, sometimes also scoring the hole being cut. It is also apparent that extreme radial pressures are exerted by the bit, and these pressures will be transmitted only to the forward portion rather than to the entire length of the tool since some alignment is secured by the boring bar 12. Accordingly, it is quite feasible to change a wear pad merely by changing it end for end in a construction such as has been described above. Further this gives rise to a modification of the invention in which the floor of the axial recess in the annular body and the bottom wall of the mounting plate are ground at an angle to each other to insure that only one wear pad will be contacting the work at a time.

Figure 6:
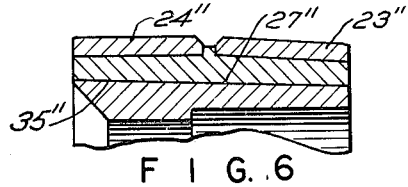
FIG. 6 is a cross sectional view similar to FIG. 5 of a modified form of trepanning head and wear pad.

To achieve this result which is illustrated in FIG. 6, it is merely necessary to grind the floor of the recess at a very slight angle relative to the axis of the boring tool. To this end the floor 27" would be ground at, say, an angle of 3° to the axis and the bottom wall of the mounting plate 22 would remain flat. In this fashion it is then necessary to partially compensate for the difference in angularity by grinding the surface of the carbide wear portion itself, such as the portions 23" and 24", to this same slight angle so that the forward portion will effectively be a reverse wedge to the angle generated by the floor 27". Thus relative to the bottom surface of the mounting plate which is the surface 35", there will be a positive angle of, say, 3° formed. The rear contact portion 23", however, is similarly formed with a positive angle so that when the wear pads are reversed and this portion lies on the forward end of the trepanning head, it will be in axial alignment. In effect, the complete cross section of the wear pad will appear as a flat triangle. In this case as in the previous case the dimension from the center of the trepanning head to the floor of each of the recesses is accurately controlled so that the wear pads are interchangeable.

I claim:

1. The method of making a trepanning head comprising the steps of providing an annular body having connection means at one end and a cutting bit shoulder at the other end, cutting a pair of axial recesses in the exterior wall of said body with the floor of each of said recesses at a predetermined geometric tangent of a common circle and the walls thereof at right angles to said floor and emerging in the outer annular surface of said body, constructing a wear pad by providing a mounting base, affixing a contact surface to the base, grinding a radius on the contact surface to a dimension where thickness measured between said contact surface and said mounting surface will be the same for each wear pad, mounting said pads on the floor of said recess and providing means for securing said wear pad in said axial recesses whereby each of said wear pads is interchangeable.

2. The method of making a trepanning head as in claim 1 wherein a pair of tandem contact surfaces are affixed to said mounting base and including the additional steps of grinding the floor of the recesses to an angle to the axis of the head and grinding each contact portion to a positive wedge from the ends of the wear pads.

3. The method of claim 1 wherein the recesses are cut to extend axially from said shouldered end and the surfaces of said recesses are ground.

References Cited by the Examiner

UNITED STATES PATENTS

| 160,484 | 3/75 | Terrey | 175—330 |
|---|---|---|---|
| 1,703,390 | 2/29 | Duffy | 175—403 X |
| 1,932,488 | 10/33 | Scott | 175—410 X |
| 2,431,581 | 11/47 | Owen et al. | 76—101 |
| 2,902,259 | 9/59 | Tilden | 175—410 X |
| 3,106,973 | 10/63 | Christensen | 175—410 X |

GRANVILLE Y. CUSTER, Jr., *Primary Examiner.*